US 8,818,535 B2

(12) United States Patent
Drake et al.

(10) Patent No.: US 8,818,535 B2
(45) Date of Patent: Aug. 26, 2014

(54) UPDATING THERMOSTAT WEEKLY SCHEDULE OVER THE AIR

(75) Inventors: Jeff Donald Drake, Louisville, KY (US); Robert Marten Bultman, Louisville, KY (US); Timothy Dale Worthington, Crestwood, KY (US); Michael Francis Finch, Lousville, KY (US); Jay Andrew Broniak, Louisville, KY (US); Christopher Recio, Louisville, KY (US); Joseph Mark Brian, Louisville, KY (US)

(73) Assignee: General Electric Company, Schenectady, NY (US)

( * ) Notice: Subject to any disclaimer, the term of this patent is extended or adjusted under 35 U.S.C. 154(b) by 551 days.

(21) Appl. No.: 13/092,356

(22) Filed: Apr. 22, 2011

(65) Prior Publication Data
US 2011/0264296 A1 Oct. 27, 2011

Related U.S. Application Data

(60) Provisional application No. 61/326,948, filed on Apr. 22, 2010.

(51) Int. Cl.
G05B 19/42 (2006.01)
G05B 11/01 (2006.01)
G01R 21/00 (2006.01)
G01R 21/06 (2006.01)

(52) U.S. Cl.
USPC ............... 700/86; 700/18; 700/87; 700/296; 702/60; 702/61; 702/62

(58) Field of Classification Search
CPC ..... G01D 4/004; Y04S 20/322; Y02B 90/242
USPC ....................... 700/18, 86–87, 286, 291, 293, 700/295–297; 702/60–63
See application file for complete search history.

(56) References Cited

U.S. PATENT DOCUMENTS

| | | | |
|---|---|---|---|
| 7,415,102 B2 | 8/2008 | Iggulden et al. | |
| 8,183,995 B2 * | 5/2012 | Wang et al. | 340/539.1 |
| 2008/0272934 A1 | 11/2008 | Wang et al. | |
| 2009/0240381 A1 * | 9/2009 | Lane | 700/296 |
| 2010/0090806 A1 | 4/2010 | Schork et al. | |
| 2010/0094470 A1 | 4/2010 | Besore et al. | |
| 2010/0187219 A1 * | 7/2010 | Besore et al. | 219/494 |
| 2011/0153106 A1 * | 6/2011 | Drake et al. | 700/295 |
| 2011/0153110 A1 * | 6/2011 | Drake et al. | 700/296 |

OTHER PUBLICATIONS

PCT/US2011/033550 International Search and Written Opinion, mailed Sep. 9, 2011.

* cited by examiner

Primary Examiner — Ramesh Patel
(74) Attorney, Agent, or Firm — Global Patent Operation; Marc A. Vivenzio

(57) ABSTRACT

Provided is a method and system for updating of schedules to a device controlled by an energy management system.

14 Claims, 3 Drawing Sheets

UPDATING THERMOSTAT WEEKLY SCHEDULE OVER THE AIR

INCORPORATION BY REFERENCE

This application claims the benefit of priority to U.S. Provisional Patent Application No. 61/326,948, filed Apr. 22, 2010, entitled "Updating Thermostat Weekly Schedule Over the Air", by Drake et al., the disclosure of which is incorporated herein by reference in its entirety.

BACKGROUND OF THE DISCLOSURE

The following disclosure relates to energy management, and more particularly to energy management of household consumer appliances, as well as other energy consuming devices and/or systems found in the home. The present disclosure finds particular application within a system which controls operation of consumer appliances, as well as other energy consuming devices and/or systems, and acts as a gateway between a Utility company network and the consumer appliances, as well as other energy consuming devices and/or systems. In some embodiments such a controller/gateway device is at times called a Home Energy Gateway (HEG).

Currently Utility companies commonly charge a flat rate for energy, but with the increasing cost of fuel prices and high energy usage during certain parts of the day, Utility companies have to buy more energy to supply customers during peak demand. Consequently, Utility companies are beginning to charge higher rates during peak demand. If peak demand can be lowered, then a potential cost savings can be achieved and the peak load that the Utility company has to accommodate is lessened.

General Electric Company has developed technology to improve the control of energy consumption within the home. Discussions of such developments have been set forth in a number of patent applications, including but not limited to U.S. Provisional Application Ser. No. 61/304,712, filed Feb. 15, 2010, and titled Energy Management of Household Appliances and U.S. Provisional Application Ser. No. 61/097,082 filed Sep. 15, 2008 (Now U.S. Ser. No. 12/559,703), titled Low Cost And Flexible Energy Management System. The disclosure in this present application builds on and extends the concepts set forth in these previously filed applications. U.S. Ser. No. 12/559,703 being fully incorporated by reference herein.

In particular, an issue addressed herein is the scheduling of the devices being controlled. For example, a thermostat may be used to control the heating and/or cooling of a home, pool, or many other devices. To increase the efficiency of energy use it is becoming common to schedule the operation of the thermostat to optimize heating and/or cooling, such as of the home but at the same time control the energy use. So in one instance such as in the winter the thermostat in the home may be scheduled to turn down the temperature in the home from 8:00 am to 4:00 pm, while the owner of the home is away at work. Then in anticipation of the owner returning at 5:00 pm, the thermostat increases the heat to warm the house. A schedule to cool the home in the summer could similarly be used to control a cooling thermostat and/or an air cooling system controller.

Drawbacks to existing systems include that they are often hardwired, in the sense that to interface with the device, the owner must go to the thermostat and be physically present at the thermostat. Other systems have the host controller monitoring the environment and then when a change occurs, the host makes changes to the thermostat operation. A drawback to this arrangement is the need for constant monitoring of the thermostat, and if the host becomes disabled control is lost.

SUMMARY

Provided is a method and system for updating of schedules for a device controlled by an energy management system.

DETAILED DESCRIPTION OF THE PREFERRED EMBODIMENTS

Figure 1:
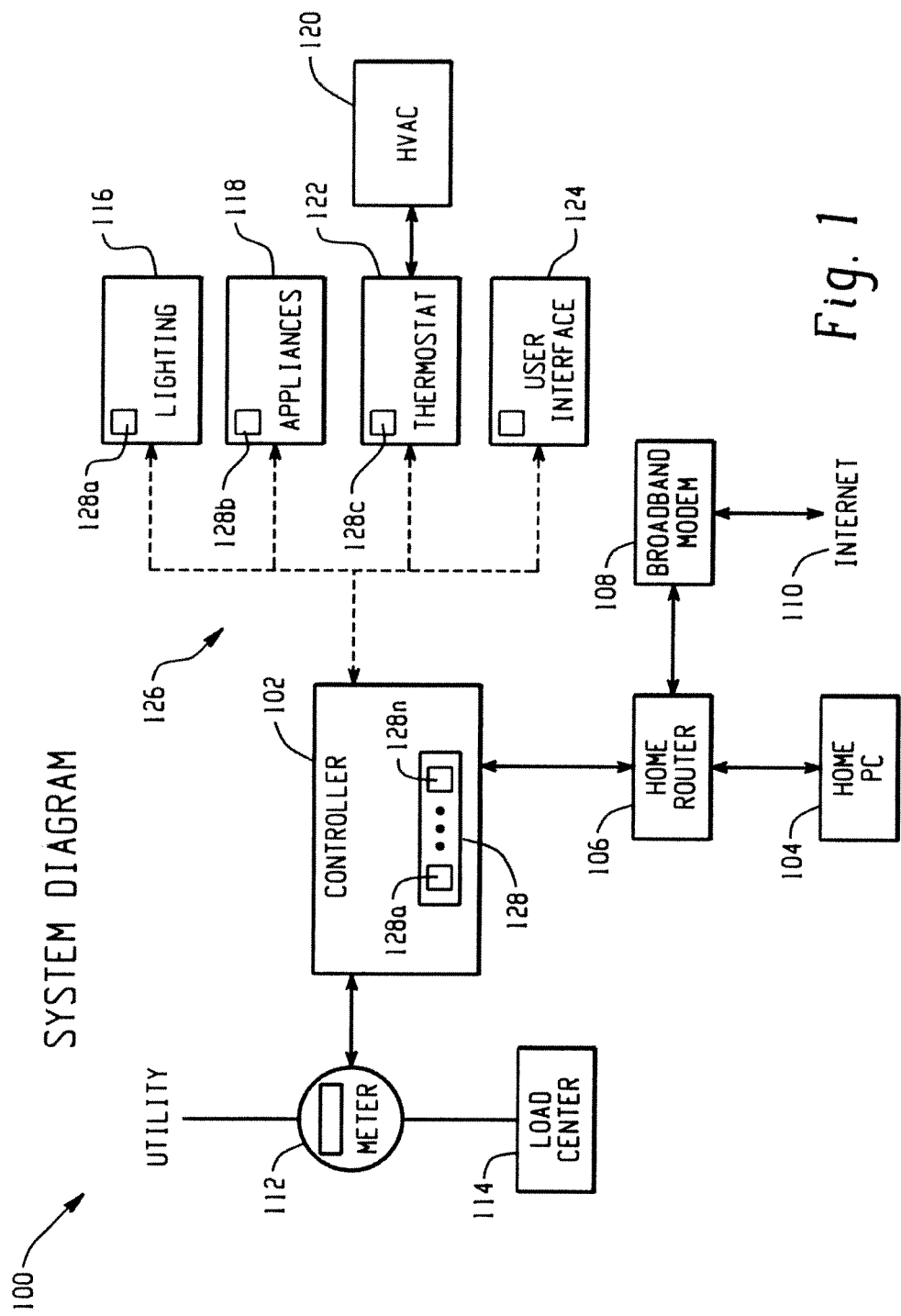
FIG. 1 illustrates a system in which the concepts of the present application are implemented.

FIG. 1 is an exemplary implementation of an energy management system 100 according to the present application. In one embodiment, the energy management system 100 may includes a controller 102, which is in connection with a home PC or other computing device 104, via a home router 106, which also provides access, via a broadband modem 108 to the internet 110. The controller 102 is also in communication with utility meter 110 which meters energy supplied to the home from load center 114. Controller 102 is used to control operation of various items within the home environment including but not limited to a lighting system 116, intelligent appliances 118, an HVAC 120 (and thermostat 122). An optional user interface 124 for the items 116-122 is also shown. As mentioned these are just examples of items that may be within a home energy network and others such as but not limited to a pool heater, lawn sprinkler systems may also be part of such an arrangement. Communication within system 100 is accomplished via a communications network 126 which may include wired and/or wireless communication as is known in the art. It is to be appreciated at least some of these items/devices and others described herein have resource load shedding (e.g., gas, water, electric, etc.) capabilities.

In one embodiment the present invention details a method of updating a thermostat schedule via the communication network (e.g., via wireless communication), where the schedule may be a weekly operation schedule (or some other time period). As used herein a schedule is data in any of a variety of formats which permits some type of autonomous load control to be run at some point in time.

As shown in FIG. 1, a schedule database 128 holds a plurality of schedules 128a-n. In one embodiment the schedule database is part of controller 102, although other configurations are possible, such as storing the schedule database in external servers, etc. The individual schedules are uploaded (see 128a-128c) when needed by the item (e.g., 116-122). These schedules will for example function in cooperation with a thermostat, for any device with an occupancy sensor, as well as other devices. For example, the schedules may be used to change refrigerator temperatures via such a specifically designed schedule, change an on/off time of a pool pump among other operations.

Thus in the present invention, instead of relying on a host wireless device to control each individual event, a full weekly (or other time frame, such as but not limited to daily, monthly, seasonally, etc.) schedule is sent to the device (e.g., the thermostat), and the device will store this schedule (with the control information) so the device can run independently of the wireless host (e.g., in one embodiment controller 102). By this design if the host goes offline, the device will continue operation in accordance with the uploaded schedule.

So in this design, the host (e.g., controller 102) will store the schedules such as in a schedule database. For example a separate summer and winter schedule. Then when the system identifies summer has arrived (e.g., by an internal clock of the host), the host will upload the summer schedule. Then when the season changes to winter the system will automatically upload the winter schedule, without the need for user intervention. The user can however, also force a schedule change by accessing the host, such as via the home computer 104, and upload a schedule already stored in schedule database. For example, if the home owner is going on vacation they can upload a previously stored vacation schedule (or they can create such a schedule store in the schedule database) and the upload it to selected devices.

The scheduling concepts of the present application also include designing the schedules via a Coordinated Universal Time (UTC) time, thereby making it un-necessary to take into account local time issues.

The described operations therefore allow the setting of a schedule via a wireless host/controller that will also allow the thermostat to run independently if the host/controller is not present (e.g., disabled or otherwise offline).

Another aspect of the system is that switching between schedules on a particular device can take place without having to manually re-enter the schedules.

Still another aspect of the present concepts is that many devices have limited user interfaces (e.g., thermostats, pool controllers, etc.). By using the interface such as of the home computer or HEM, the user has an improved experience. This will also allow the target device (e.g., the thermostat) to be made cheaper by reducing the cost of the device by not requiring an involved user interface.

Figure 2:
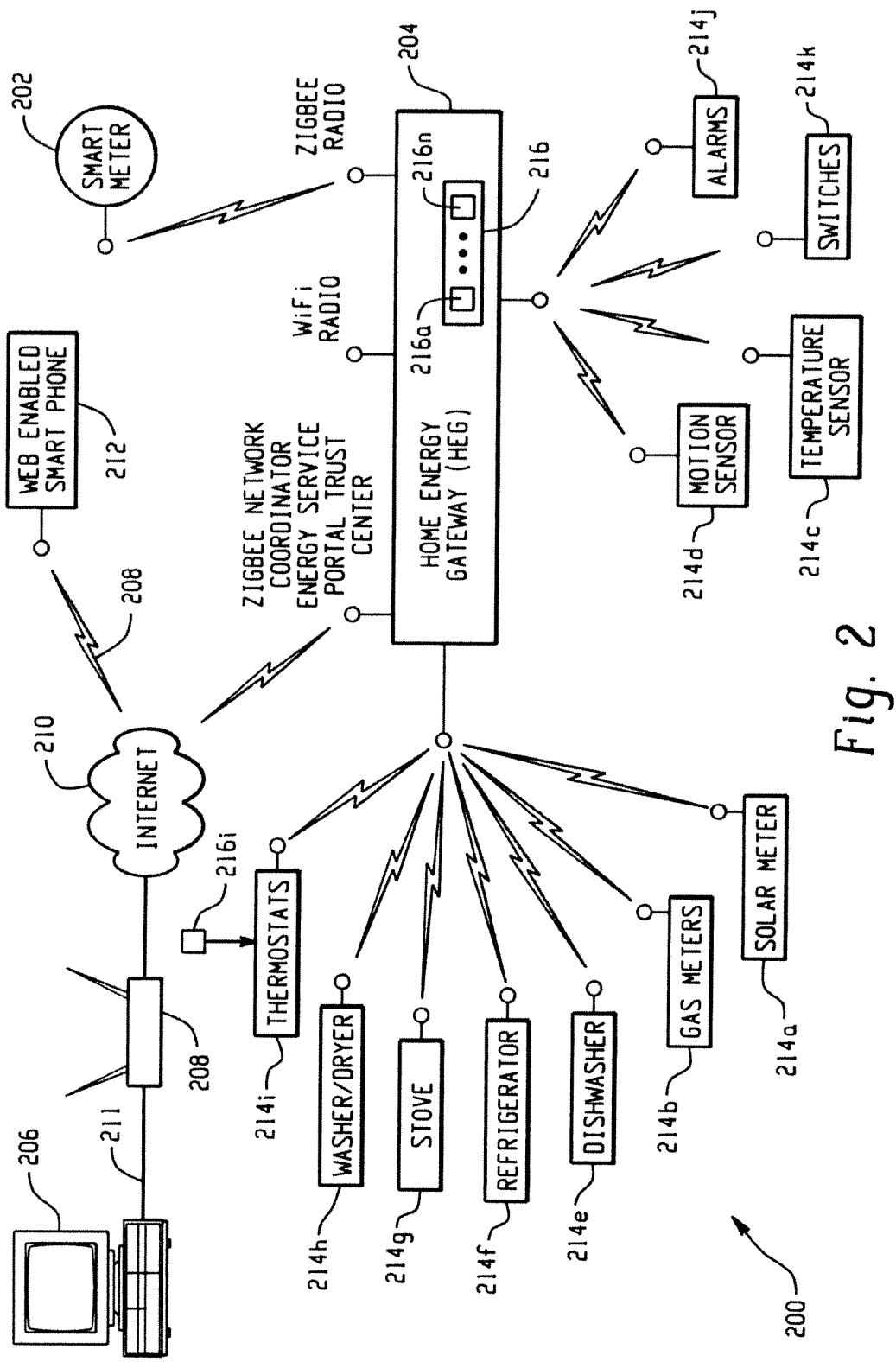
FIG. 2 illustrates a HEG based system in which the concepts of the present application are implemented.

Turning to FIG. 2, depicted is an energy management system 200, in which the concepts of the present application are implemented. The main source of information flow for the home is shown as smart electric meter 202 acting as trust center, coordinator, and/or an energy service portal (ESP), and which is configured to communicate with a home energy gateway (HEG) 204.

It is well known that these functions of smart meter 202 may be separated into different devices. For example, if the home does not have a smart meter 202—so the electric meter functions only as a meter to provide consumption information—other components can be used to provide the additional capabilities. For example, homes without smart meter 202, can have the metering functionality of smart meter 202 provided via a simple radio and current transformer (CT) configuration. Also, there are devices that can be placed on the outside of the meter to communicate its consumption by reading pulse counts or the rotating disk of the meter. In this embodiment, smart meter 202 is shown with an IEEE 802.15.4 (ZigBee) radio, but the meter could also communicate by a number of other standards such as IEEE 1901 (Home Plug Green Phy or Home Plug A V), among others.

FIG. 2 also shows a computer (such as a desk top, lap top or other computing device) 206 attached to a modem/router 208, a common manner of attaching computers to the internet 210. In FIG. 2, a computer is connected to the router by a wired IEEE 802.3 (Ethernet) connection 211. However, it is to be appreciated the connection could be made by other known connections such as an IEEE 802.11 (Wifi) connection, power line communication or power line carrier (PLC) connection, among others. In one embodiment, the PLC connection is made using an adaptor such as sold by Netgear or other manufacturer for that purpose. Although a modem/router arrangement is shown in system 200, it is not essential, and the system would function for its primary purpose of monitoring and displaying energy consumption information without this arrangement. In that case computer 206 would connect directly to HEG 204 via a wired or wireless connection.

A web enabled smart phone 212 is configured to connect to HEG 204 for displaying data and configuring accessories (such as home appliances 214a-214k), except that only a wireless connection is available. This provides another entry point where a user may generate schedules that are stored in the described schedule database, and selectively uploaded to an appropriate device.

Accessories 214a-214k may be grouped into two main categories, sensors and devices (where, depending on how they are used, some accessories fall into both categories). Examples of sensors include solar meters 214a, gas meters 214b, temperature sensors 214c, motion sensors 214d, and appliances reporting their power consumption (such as dishwashers 214e, refrigerators 214f, stoves 214g, washers/dryers 214h, etc.). Devices include thermostats 214i, alarms 214j and simple switches 214k, along with the appliances (e.g., dishwashers 214e, etc.), when performing their normal functions. The foregoing are just some examples of accessories to which the concepts of the present application will apply.

The HEG 204 is constructed with computational capabilities and multiple communication technologies. In contrast to existing controllers (such as an HEM) used in home energy systems, the special purpose HEG 204 is significantly smaller, cheaper, and consumes less power. The HEG 204 also has the capability of operating over multiple communication networks, which allows HEG 204 to acquire and manipulate data of one communication network (e.g., that which monitors/controls the home appliances) and to supply that manipulated data to another communication network (e.g., to the consumer electronics network, such as to a home computer, smart phone, web-enabled TV, etc.), even though these networks are not generally compatible. As another example, the HEG 204 is connected to system loads (e.g., the home appliances, etc.) over one type of communication network, to the Utility company over a different communication network, and to a display over a third different communication network. Thus in one embodiment the HEG 204 receives data from one of the communication networks (e.g., a first communication network or interface), it then: (i) reformats the data from the first communication network for communication to another communication network (e.g., a second communication network or interface), (ii) requests data from devices within the energy management system, and (iii) replies to the communication network from which it received the data.

In one particular embodiment connection to the display is via a WiFi communication network, connection to the Utility Company (over the meter) is via a ZigBee communication network, and connection to the home device/appliance network is over another ZigBee communication network. While the above discloses one communication configuration, it is known that different Utility Companies will provide energy and information about the energy in different communication formats and though different communication channels. For example, the whole home consumption could be available over the Internet, or via a ZigBee meter on the second network. Further, in addition to the display, several home automation devices including pool controllers, emergency generators, and storage batteries are designed to be accessed over Ethernet using Internet Protocol (IP). The system of the present application is sufficiently flexible to be configured for use with the different communication formats and communication channels of different Utility Companies.

Similar to the design described in connection with FIG. 1, the present scheduling concepts are also applied to the system of FIG. 2. As seen in FIG. 2, HEG 204 includes a schedule database 216, having a plurality of schedules 216a-216n that may be applicable to the operation of various ones of the accessories 214a-214k. Each of these devices may need a distinct schedule, and may have different schedules depending on the time of year of events happening throughout the year. In operation, the HEG will select an appropriate schedule from the schedule database 216 and load that schedule (e.g., 216i) on the corresponding device (e.g., thermostat 214i). This can be done, in one embodiment, via a wireless communication network of the described system. The loaded schedule will then be used to control operation of the associated accessory (e.g., the various devices and/or sensors). As also mentioned in connection with FIG. 1, the schedule loaded on the accessory may be switched automatically, without user intervention, at some predetermined period (e.g., a change from summer to fall or winter). This is accomplished, in one embodiment, by programming the HEG 204 upon system setup or during updating of system parameters. Also, similar to the discussion in connection with FIG. 1, by the design of the present invention if the host or HEG becomes inoperative the schedule will nevertheless continue to control the operation of the accessory to which it is associated.

Figure 3:
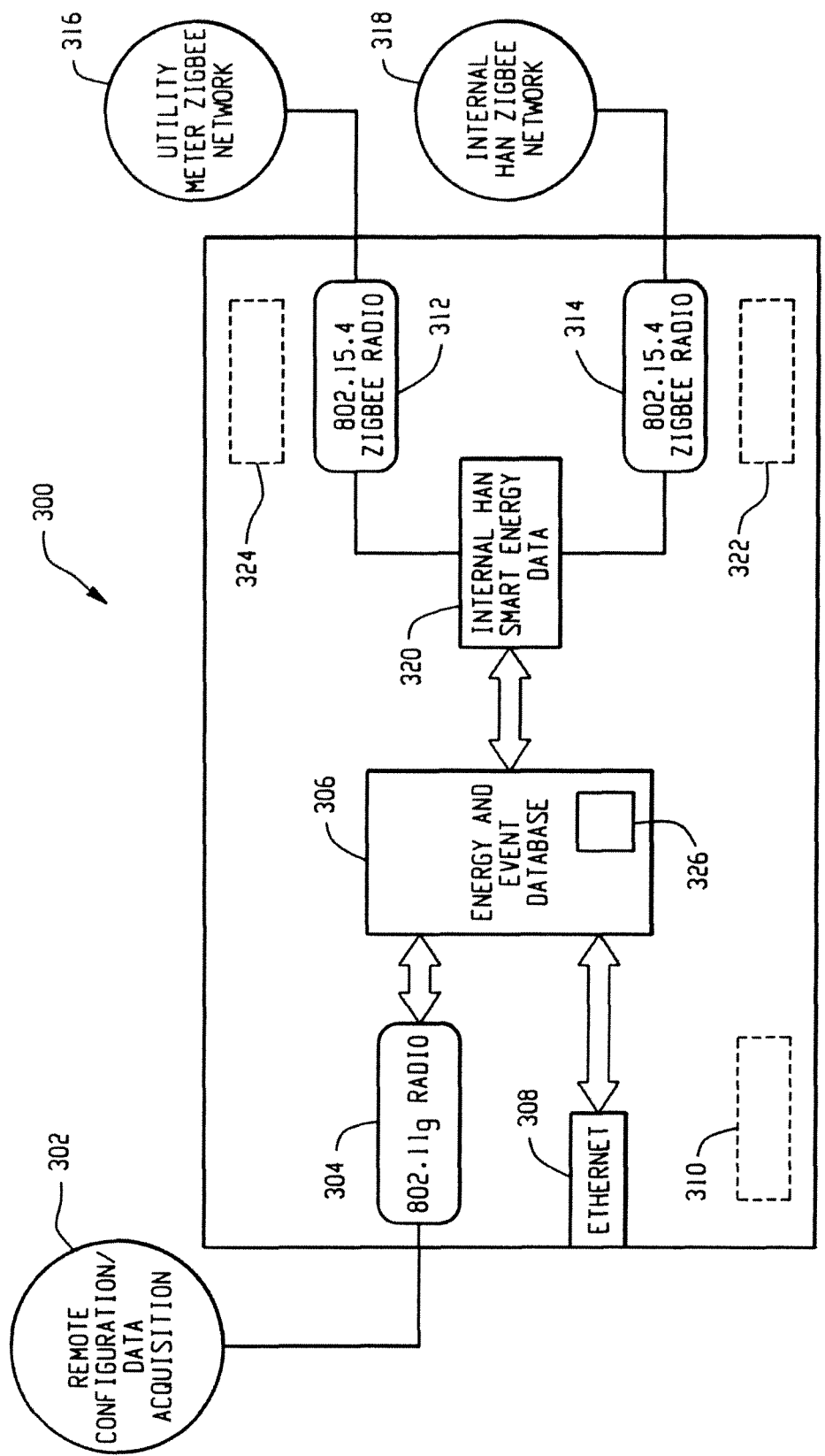
FIG. 3 is a block diagram of a Home Energy Gateway (HEG) of the present application.

Turning to FIG. 3 depicted is a block diagram 300 illustrating one embodiment of the HEG 204. On the left hand side of the figure outside of block diagram 300 is remote configuration and data acquisition block 302 (which is not part of HEG block diagram 300). The external data and remote configuration requests are received into block 300 via WiFi radio block 304, which in turn accesses energy and event database 306. The external data and remote configuration requests of block 302 could also enter block diagram 300 via Ethernet port 308 in order to access the energy and event database 306. In still a further embodiment a power line communication (PLC) adapter 310 (dotted lines) may be used with or as an alternative to the Ethernet port 308, in order to input the external data and remote configuration requests 302 into the energy and event database 306.

On the right hand side of FIG. 3 is a first data interface block 312 (such as a 802.15.4 Zigbee radio) and a second data interface block 314 (such as a 802.15.4 Zigbee radio). The first data interface block 314 is configured to send and receive data and configuration messages to/from utility meter Zigbee network 316, and second data interface block 314 is configured to send and receive data and configuration messages to/from the internal HAN (e.g., data from appliances in the system) 318. The data and messages from these sources also connect to the energy and event database 306, via internal HAN smart energy block 220. In still a further embodiment power line interfaces 322, 324 (dotted lines) may be included with or as an alternative to the interfaces 312, 318. As shown in this embodiment, and as previously discussed in connection with FIGS. 1 and 2 schedule database 326 (similar to databases 128 and 216) is configured to store a plurality of different operation schedules for different operation parameters for different accessories of the system.

This invention has been described with reference to the preferred embodiments. Obviously, modifications and alterations will occur to others upon reading and understanding the preceding detailed description. It is intended that the invention be construed as including all such modifications and alterations.

The invention claimed is:

1. A method of programming a device with resource load shedding capability with a schedule comprising:
   using a central controller or otherwise referred to as a separate networked device;
   using a user interface to enable a plurality of schedules;
   storing in a schedule database the plurality of the schedules;
   selecting a current schedule from the plurality of schedules;
   communicating with a device to load the schedule onto the device; and
   loading the current schedule onto the device.

2. The method according to claim 1 wherein the device operated in accordance with the loaded schedule, when the central controller is not operating.

3. The method according to claim 1 further including changing a current schedule on a device with another schedule stored in the schedule database.

4. The method according to claim 3, wherein the step of changing occurs automatically without human intervention.

5. The method according to claim 1 wherein the loading of the current schedule is accomplished using a wireless communication system.

6. The method according to claim 1 wherein the plurality of schedules are designed using a UTC time.

7. The method according to claim 1 wherein the device is a thermostat.

8. A premise data management system including sensors and a user interface, for transmitting data/commands comprising:
   a first data interface configured to transmit to and receive data from the user interface;
   at least a second data interface configured to access data from the sensors; and
   a gateway which receives the data from the first interface, and is configured to:
   (i) reformat the data from the first interface for communication to the second interface,
   (ii) request data from devices within the energy management system,
   (iii) reply to the first data interface, and
   (iv) transmit schedules from a schedule database of the gateway to selected devices within the energy management system, wherein the schedules control operation of the selected devices.

9. The system of claim 8 wherein the schedule located on the device is selected from among a plurality of schedules stored in a schedule database.

10. The method according to claim 9 wherein the plurality of schedules are designed using a UTC time.

11. The system according to claim 8 wherein the device operates in accordance with the schedule located on the device even when the gateway is not operative.

12. The system according to claim 8 wherein communication in the system is accomplished via a wireless network.

13. The system according to claim 8 wherein the gateway is designed to change schedules on a device automatically without human intervention.

14. The method according to claim 8 wherein the device is a thermostat.

* * * * *

UNITED STATES PATENT AND TRADEMARK OFFICE
CERTIFICATE OF CORRECTION

| | | |
|---|---|---|
| PATENT NO. | : 8,818,535 B2 | Page 1 of 1 |
| APPLICATION NO. | : 13/092356 | |
| DATED | : August 26, 2014 | |
| INVENTOR(S) | : Drake et al. | |

It is certified that error appears in the above-identified patent and that said Letters Patent is hereby corrected as shown below:

On the Title Page, in item (75), under "Inventors", in Column 1, Line 5, delete "Lousville," and insert -- Louisville, --, therefor.

In the Specification

In Column 2, Line 28, delete "utility meter 110" and insert -- utility meter 112 --, therefor.

In Column 3, Line 59, delete "modern/router" and insert -- modem/router --, therefor.

In Column 4, Line 60, delete "though" and insert -- through --, therefor.

In Column 5, Line 54, delete "block 220." and insert -- block 320. --, therefor.

In the Claims

In Column 6, Line 52, in Claim 10, delete "method" and insert -- system --, therefor.

In Column 6, Line 62, in Claim 14, delete "method" and insert -- system --, therefor.

Signed and Sealed this
Fifth Day of May, 2015

Michelle K. Lee
*Director of the United States Patent and Trademark Office*